W. H. COLE.
DISK HARROW.
APPLICATION FILED MAR. 30, 1908.
No. 906,692.
Patented Dec. 15, 1908.
2 SHEETS—SHEET 2.
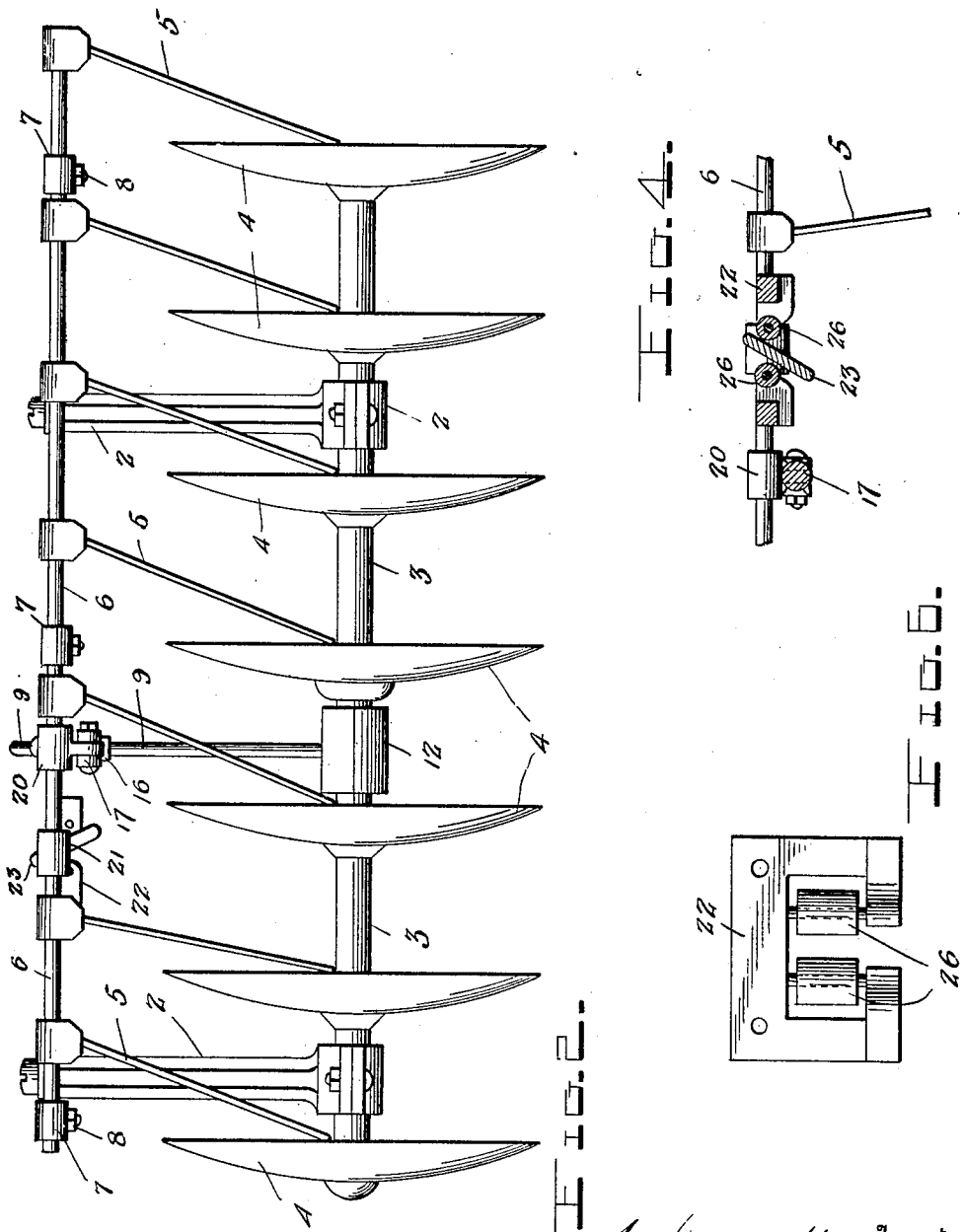
Witnesses
Chas. R. Griestauer.
M. L. Skinner
Inventor
William H. Cole
By Watson E. Coleman
Attorney

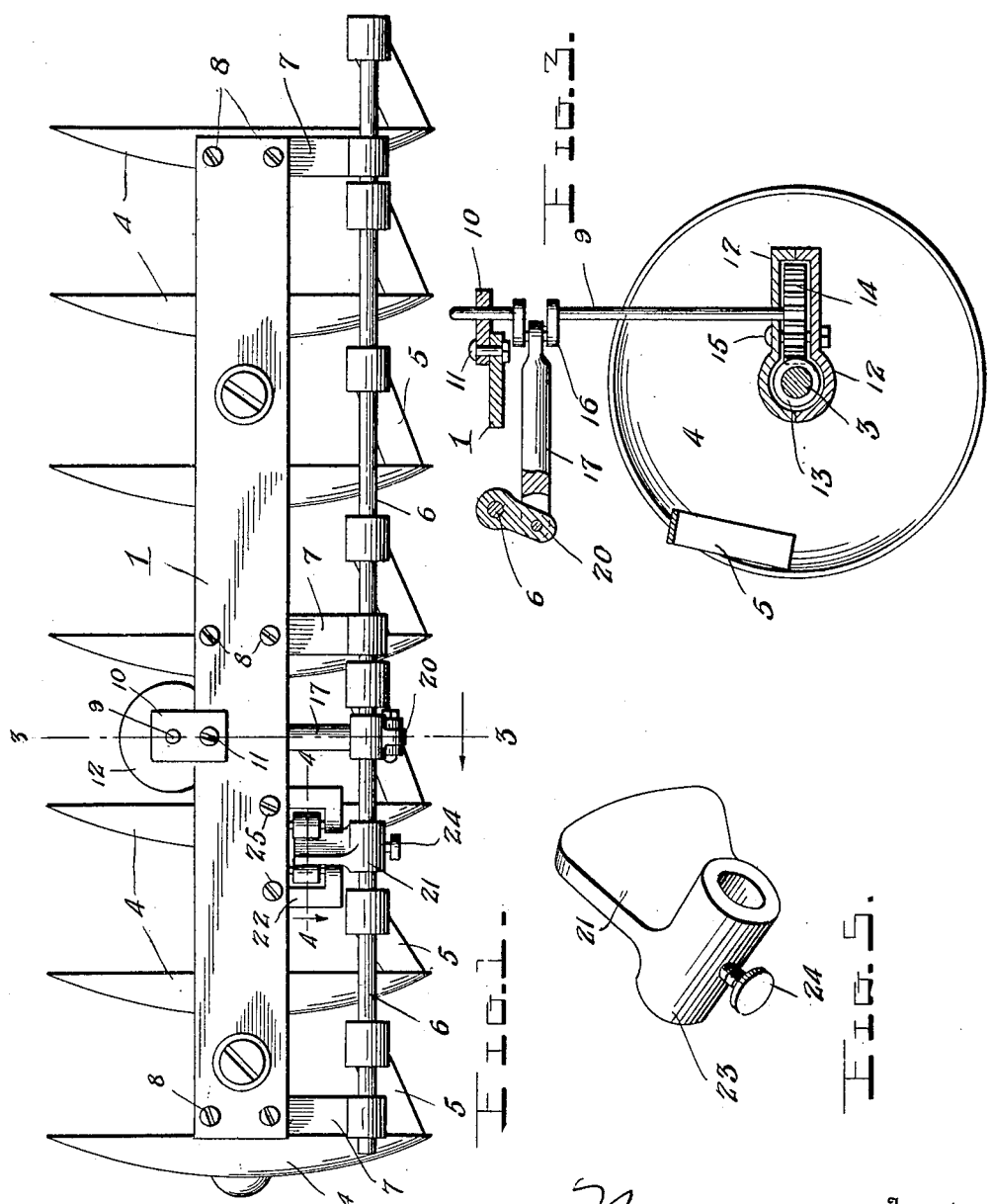

UNITED STATES PATENT OFFICE.

WILLIAM H. COLE, OF CHARLES CITY, IOWA.

DISK HARROW.

No. 906,692.   Specification of Letters Patent.   Patented Dec. 15, 1908.

Application filed March 30, 1908. Serial No. 424,222.

*To all whom it may concern:*

Be it known that I, WILLIAM H. COLE, a citizen of the United States, residing at Charles City, in the county of Floyd and State of Iowa, have invented certain new and useful Improvements in Disk Harrows, of which the following is a specification, reference being had to the accompanying drawings.

My invention relates to improvements in disk harrows and more particularly to means for scraping the earth from the disks of such implements.

The object of the invention is to provide a disk cleaning mechanism for a harrow or the like which will be simple, practical and effective and which will be operated from the axle of the disks.

With the above and other objects in view, the invention consists of the novel features of construction and the combination and arrangement of parts hereinafter fully described and claimed and illustrated in the accompanying drawings, in which—

Figure 1 is a plan view of a part of a disk harrow embodying my invention; Fig. 2 is a rear elevation of the same; Fig. 3 is a vertical cross section taken on the plane indicated by the line 3—3 in Fig. 1; Fig. 4 is a detail section taken on the plane indicated by the line 4—4 in Fig. 1; Fig. 5 is a detail perspective of the cam member; and Fig. 6 is a detail view of the guide or keeper member.

In the drawings 1 denotes a portion of the main frame of the machine which may be of any suitable or preferred form and construction, the portion here shown consisting of a horizontal top bar provided with depending brackets 2 carrying bearings for the axle 3 of the disks 4. The disks are of concavo-convex form and are suitably mounted at intervals upon the axle.

5 denotes the scrapers which are in the form of resilient blades and one of which is provided for each of the disks and adapted to swing across the same from its center to its periphery to remove the earth therefrom. Said scrapers are angularly disposed and have their upper ends suitably secured to a supporting rock shaft 6 disposed longitudinally in rear of the top bar of the main frame and mounted for both an oscillatory movement and a slight longitudinal sliding or shifting movement in bearing brackets 7 bolted, as at 8, to the top bar of the main frame.

The shaft 6 obtains its oscillatory movement from the disk axle 3, as more clearly shown in Fig. 3. These driving connections comprise an upright crank shaft 9 journaled at its upper end in a bearing bracket 10 bolted at 11 upon the top bar of the main frame and journaled at its lower end in a casing 12 loosely mounted on the axle 3 and adapted to inclose a worm 13 and a worm gear 14, one of which is fixed to the axle 3 and the other to the crank shaft 9. Said gear casing 12 is composed of two separable sections united by bolts 15, and it effectively excludes dirt from the worm gear. The crank 16 in the upper portion of the shaft 9 is connected by a pitman 17 to an oscillatory or rock arm 20 suitably fixed to the supporting rock shaft 6 of the scrapers. It will be seen that as the harrow moves forwardly the disks will rotate and the movement of their axle 3 will be imparted through the worm gearing, the upright crank shaft, the pitman and the rock arm to the rock shaft 6 so that the scrapers will be oscillated back and forth between the centers and the peripheries of the disks.

For the purpose of holding the scraper blades always at effective working relation with the concave faces of their disks I provide an improved means for shifting or sliding the rock shaft 6 longitudinally as it is rocked or oscillated. This means comprises a cam member 21 carried by said rock shaft and a guide or keeper member 22 carried by the main frame. The cam member is in the form of a portion of a spiral flange and comprises an angularly disposed plate which projects radially from a hub 23 adapted to be held in an adjusted position upon the rock shaft 6 by a set screw 24 or any equivalent means. The angular or spiral plate forms a cam and projects into the fixed guide 22 so as to swing back and forth therein as the shaft 6 is operated and thereby shift said shaft back and forth in a longitudinal direction. The guide 22 is in the form of a recessed plate bolted at 25 to the top bar of the main frame and adapted to receive the cam plate or arm in its recessed portion. Anti-friction rollers 26 are preferably journaled in the bracket so as to engage the opposite faces of the cam plate or arm to reduce friction.

In operation, it will be seen that as the harrow is drawn over the ground the scraper blades will be oscillated back and forth over the concave faces of their disks and owing to the cam device for shifting them longitudinally they will be constantly maintained in effective working relation with the concave faces of the disks.

It will be noted that the invention may be easily applied to and adjusted upon disk harrows of the character set forth and that it will be entirely automatic in its operation and will need no attention on the part of the driver of the harrow.

Having thus described my invention what I claim is:

1. In a disk harrow, the combination of a main frame, a horizontal shaft journaled thereon, a series of concavo-convex disks fixed to said shaft, a rock shaft mounted for rotary and longitudinal sliding movement, scraper blades fixed to said rock shaft and adapted to engage said disks, a recessed guide bracket fixed to the frame, a radially projecting, angularly disposed cam plate longitudinally adjustable upon the rock shaft and projecting into the recess in said guide bracket, and means for imparting the motion of the disk shaft to said rock shaft.

2. In a disk harrow, the combination of a main frame, a horizontal shaft journaled thereon, a series of concavo-convex disks fixed to said shaft, a rock shaft mounted for rotary and longitudinal sliding movement, scraper blades fixed to said rock shaft and adapted to engage said disks, a recessed guide bracket fixed to the frame, a radially projecting, angularly disposed cam plate longitudinal adjustable upon the rock shaft and projecting into the recess in said guide bracket, superposed bearings upon the frame and the disk shaft, a vertically disposed crank shaft journaled in said bearings, a worm gear upon the lower end of the crank shaft, a worm upon the disk shaft in mesh with said worm gear, a crank arm upon the rock shaft and a connecting rod between the crank of said crank shaft and said crank arm on the rock shaft, substantially as described.

3. In a disk harrow, the combination of a main frame, a horizontal shaft journaled thereon, a series of concavo-convex disks fixed to said shaft, a rock shaft mounted for rotary and longitudinal sliding movement, scraper blades fixed to said rock shaft and adapted to engage said disks, a bracket plate fixed to the main frame and having its projecting edge recessed, opposing anti-friction rollers journaled in the recess of said bracket plate, a cam member having a hub portion to receive the rock shaft, an angularly disposed, radially projecting plate to enter between said anti-friction rollers, a set screw in the hub of said cam member for adjustably retaining the latter upon the rock shaft, and means for imparting the motion of the disk shaft to said rock shaft.

In testimony whereof I hereunto affix my signature in the presence of two witnesses.

WILLIAM H. COLE.

Witnesses:
MORTON WILBUR,
FRED. A. FRUDDEN.